United States Patent [19]

Oakford

[11] Patent Number: 5,435,573
[45] Date of Patent: Jul. 25, 1995

[54] WIRELESS REMOTE CONTROL AND POSITION DETECTING SYSTEM

[75] Inventor: Howerd Oakford, Bracknell, United Kingdom

[73] Assignee: Visioneering International, Inc., Atlanta, Ga.

[21] Appl. No.: 47,111

[22] Filed: Apr. 13, 1993

[51] Int. Cl.⁶ .......................... A63F 9/00; G08C 21/00
[52] U.S. Cl. ................................. 273/438; 273/148 B; 345/158
[58] Field of Search ............... 273/148 B, 434, 438, 273/85 G; 345/158, 157, 156

[56] References Cited

U.S. PATENT DOCUMENTS

| | | | |
|---|---|---|---|
| 4,111,421 | 9/1979 | Mierzwinski | 273/85 G |
| 4,250,378 | 2/1981 | Mutton | 250/221 |
| 4,565,999 | 1/1986 | King et al. | 340/706 |
| 4,578,674 | 3/1986 | Baker et al. | 340/710 |
| 4,654,648 | 3/1987 | Herrington et al. | 340/710 |
| 4,745,402 | 5/1988 | Auerbach | 340/709 |
| 4,754,268 | 6/1988 | Mori | 340/710 |
| 4,885,433 | 12/1989 | Schier | 178/19 |
| 4,895,376 | 1/1990 | Shiung-Fei | 273/313 |
| 4,924,216 | 5/1990 | Leung | 340/709 |
| 5,076,584 | 12/1991 | Openiano | 273/148 B |
| 5,126,513 | 6/1992 | Wang et al. | 345/158 |

Primary Examiner—Jessica J. Harrison
Attorney, Agent, or Firm—Troutman Sanders; Joel S. Goldman; Gregory J. Kirsch

[57] ABSTRACT

A wireless remote control system is provided. The remote control system includes a remote unit and a receiver unit, and may be utilized in connection with a video game system or other controllable system. The receiver unit includes a plurality of detectors for detecting a signal transmitted by a remote unit. An angle-limiting device is coupled to each detector for limiting the signal which may be received by the particular detector to that signal which is transmitted from a particular location. In one embodiment, the angle-limiting device may limit the signal received by the detector to that signal transmitted from within a specified angular range relative to the detector. In a preferred embodiment, the angle-limiting devices coupled to the plurality of detectors may be arranged so that each angle-limiting device allows a signal to be received by the respective detector from a unique angular region. In another embodiment, the angular regions may be overlapping. In operation, a signal transmitted from the remote unit is received by one or more of the detectors, and based upon the strength of the signal received by each detector, the angular location of the remote unit relative to the receiver unit may be determined.

28 Claims, 7 Drawing Sheets

WIRELESS REMOTE CONTROL AND POSITION DETECTING SYSTEM

BACKGROUND OF THE INVENTION

1. TECHNICAL FIELD

The present invention generally relates to a remote control system, and more particularly, to a system capable of delineating the angular location of a remote control unit.

2. DESCRIPTION OF THE PRIOR ART

The popularity of video games—that is, games which may be played by a user in conjunction with a video system, such as a conventional television—has grown enormously in recent years. Such video games generally comprise a video game system or console linked to a television monitor. For example, the user may load a video game by inserting a game cartridge into the video game console in order to play the particular video game programmed into the cartridge. As the game is played, the user is allowed to exert some level of control over various visual scenarios taking place on the television screen.

For example, one popular video game which has been developed allows the user of the video game to maneuver a small image of a person over various types of "terrain", through tunnels, under water, etc., in order to score points. In order to navigate through the terrain presented on the screen, the user of the game must make the "person" run and jump at different times, depending upon the particular terrain and the obstacles which the game places in the user's path. The movements which the "person" may make are controlled by the user by pushing one or more of a number of electrical switches located on a control unit physically wired to the video game control unit.

In order to provide more realism when playing a video game, control units, differing from the basic control units having push buttons (switches), have been developed for use with video game systems. For example, for those video games which require the control of the image of a person on the screen, control units have been developed which lie flat on the ground, and which are activated when a user steps on or simulates a running movement on the control unit. Of course, given the nature of these control units, they are limited as to the type of control which they allow the user to exert over the video game.

Other types of control units for video games have been developed which are not physically connected to the video game console, but rather utilize infra-red or other electromagnetic radiation to send signals to the console. Such control units are not unlike the control units which are commonly used with television sets for channel and volume control. These control units may merely replicate the basic control features found on the hard-wired conventional control units, albeit without the need for a physical wire connection.

While all of the above-mentioned control units and video game systems provide a limited degree of control of the action taking place on the video screen, there still exists a need in the art for a control unit with added functionality. As described below, these and other shortcomings of the prior art are effectively overcome by the teachings of the present invention.

SUMMARY OF THE INVENTION

It is therefore an object of the present invention to provide an improved wireless remote control system.

It is another object of the present invention to provide an improved remote control system which is able to detect the location of a remote unit.

It is another object of the present invention to provide an improved remote control system which is able to detect remote control operations of a remote unit.

It is another object of the present invention to provide an improved remote control system which is able to remotely control a video game system.

In accordance with the present invention, a wireless remote control system is provided. The remote control system includes a remote unit and a receiver unit, and may be utilized in connection with a video game system or other controllable system. The receiver unit includes a plurality of detectors for detecting a signal transmitted by a remote unit. An angle-limiting device is coupled to each detector for limiting the signal which may be received by the particular detector to that signal which is transmitted from a particular location. In one embodiment, the angle-limiting device may limit the signal received by the detector to that signal transmitted from within a specified angular range relative to the detector. In a preferred embodiment, the angle-limiting devices coupled to the plurality of detectors may be arranged so that each angle-limiting device allows a signal to be received by the respective detector from a unique angular region. In another embodiment, the angular regions may be overlapping. In operation, a signal transmitted from the remote unit is received by one or more of the detectors, and based upon the strength of the signal received by each detector, the angular location of the remote unit relative to the receiver unit may be determined. The particular signal characteristics transmitted by the remote unit and received by the receiver unit may also be determined by the receiver unit. The angular location of the remote unit and the particular signal characteristic may be utilized by the receiver unit to provide input into a video game system or other controllable system.

DETAILED DESCRIPTION OF THE INVENTION

In a preferred embodiment, the present invention comprises a remote unit transmitter and a receiver unit, which may be used in conjunction with a video game system or any other controllable system. The remote unit may transmit a signal to the receiver unit, which in turn may decode the received signal while also determining the relative position of the receiver unit. Data representing the decoded received signal as well as data corresponding to the relative position of the remote unit may then be provided to the video game system (or other system) for further processing.

For example, the present invention may be used in conjunction with the Nintendo Entertainment System (NES), which is a general purpose video game system manufactured and distributed by Nintendo of America of Seattle, Washington. During normal operation, the NES is utilized with control pads physically connected to the NES video game console via wires. The control pads include various switches which, when pressed, are sensed by the video game console, which then reacts accordingly.

In one embodiment, the remote unit transmitter and the receiver unit of the present invention may be utilized, instead of the control pads, to provide input into the video game system. In this case, the receiver unit may receive transmitted signals from the remote unit, may process these received signals, and may provide input into the video game unit in order to accomplish various functions.

A detailed description of the various components and processes of the present invention is provided below.

Figure 1:
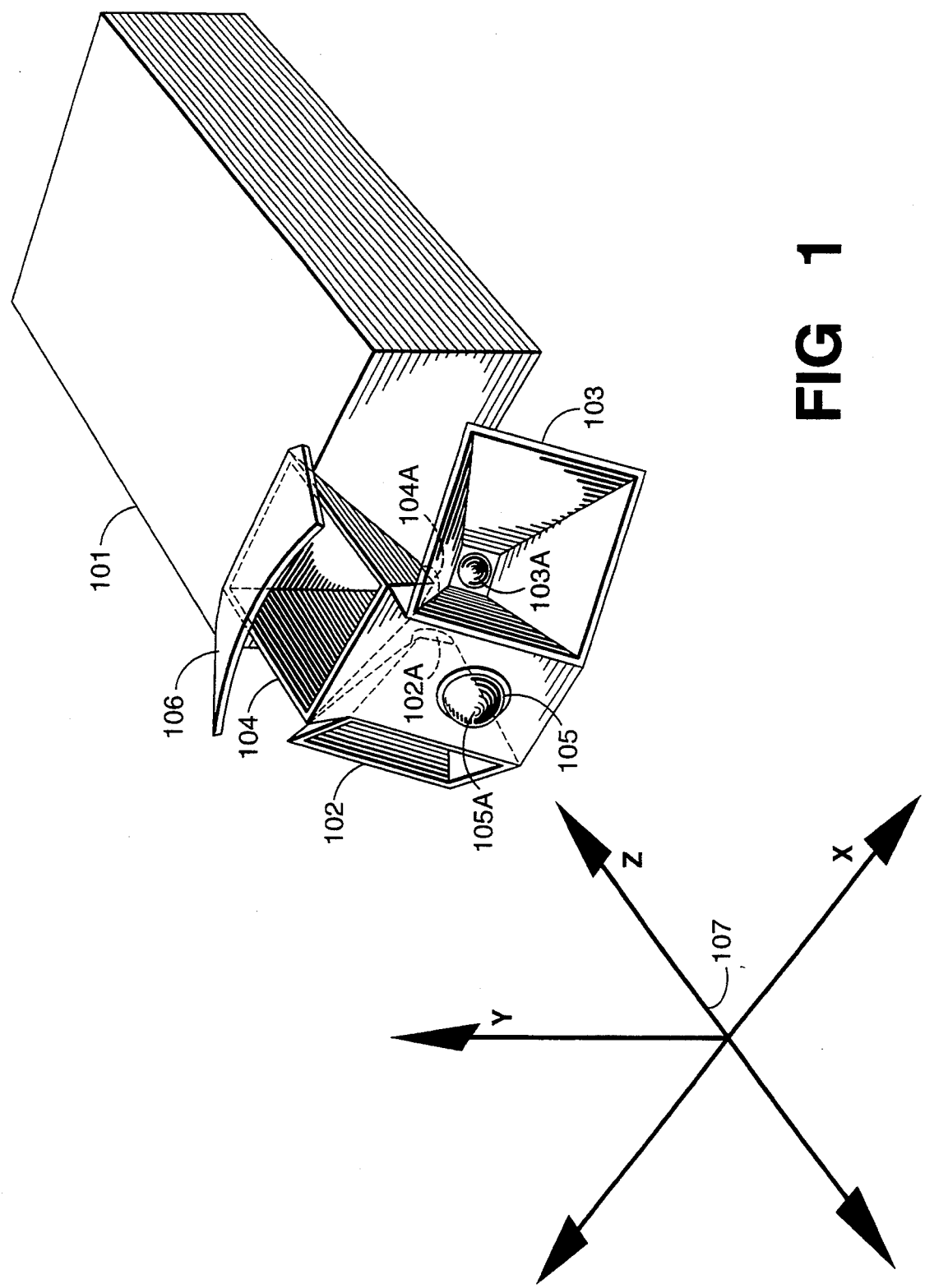
FIG. 1 is a perspective view of the receiver unit in a preferred embodiment of the present invention.

First, FIG. 1 shows a three-dimensional perspective view of the external casing and configuration of the receiver unit of the present invention is shown, according to a preferred embodiment. Block and schematic diagrams depicting the functionality and circuit construction of the receiver unit will be discussed in more detail below with respect to FIGS. 3(a) and 3(b).

Referring to FIG. 1, the main housing of the receiver unit, in one embodiment, is shown as reference numeral 101. Housing 101 encloses the circuitry of FIGS. 3(b) and 3(c) (discussed below), and is shown in FIG. 1 merely for completeness. Any other suitable housing 101 may, of course, be utilized as well.

Appended onto one end of housing 101 are additional components of the receiver unit: pyramid 102, detector 102a, pyramid 103, detector 103a, pyramid 104, detector 104a, lens 105, detector 105a (not specifically shown) within detector 105, and shade 106. The operation of these components will be described below.

In a preferred embodiment, pyramids 102, 103 and 104 are made out of cardboard, and coated with aluminum on their inner surfaces in order to better reflect light. Each of pyramids 102, 103 and 104 may be composed of four sections, each section being in the shape of an equilateral triangle truncated near the apex of the pyramid closest to detectors 102a, 103a and 104a, respectively. The square base of the pyramid is open. In a preferred embodiment, each side of each of the four "equilateral triangles" of each pyramid may be made to be approximately 50 mm in length.

Near the apex of each pyramid may be mounted a detector, such as an infra-red detector diode, shown as reference numerals 102a, 103a and 104a. In a preferred embodiment, detectors 102a, 103a and 104a may comprise part number BPW41N, available from National Semiconductor Corporation.

Each of pyramids 102, 103 and 104 act as a funnel, collecting, for example, infra-red light only from certain angles, roughly corresponding to the region marked out by a continuation of the sides of the respective pyramid away from the apex. For example, detector 102a is able to detect light transmitted from a region (called, herein, the "active region") extending away from detector 102a and between the four sides of pyramid 102 as they continue away from detector 102a. Pyramid 103, detector 103a, pyramid 104 and detector 104a operate in a similar manner.

Pyramids 102, 103 and 104 may be positioned, in one embodiment, so that each pyramid is pointing into a distinct region extending away from each of the detector 102a, 103a and 104, respectively, of the pyramids. These regions may either be overlapping with one another, or may be mutually exclusive. Importantly, because the detector 102a, 103a or 104a of each pyramid 102, 103 or 104, respectively, may only effectively detect light transmitted from its active region, the relative position of the source of such transmitted light may be determined based upon which, if any, detectors 102a, 103a, and/or 104a, has detected the light.

To illustrate, the pyramids 102, 103 and 104 of the present invention may be positioned, in a preferred embodiment, with respect to an imaginary three-dimensional axis depicted as reference numeral 107 in FIG. 1. The axis includes a "z" axis extending along the length of housing 101, an "x" axis extending horizontally across the front face of housing 101 containing the pyramids, etc., and a "y" axis extending vertically along the front face of housing 101. Note that FIG. 1 is shown in a perspective view from a position located in the positive "y" positive "x" and negative "z" octant depicted by reference numeral 107.

As shown in FIG. 1, pyramid 102 may be positioned so that its square opening, opposite from detector 102a, is facing in the negative "x" and negative "z" direction. In this case, the active region between the four equilateral triangles of pyramid 102 is located in both the positive and negative "y" directions.

Likewise, pyramid 103 may be positioned so that its square opening, opposite from detector 103a, is facing in the positive "x" and negative "z" direction. The active region between the four equilateral triangles of pyramid 103 is located in both the positive and negative "y" directions. Finally, pyramid 104 may be positioned so that its square opening, opposite from detector 104a, is facing in the positive "y" direction. The active region between the four equilateral triangles of pyramid 104 is located in both the positive and negative "x" directions, as well as the positive and negative "z" directions.

It should be noted that the exact positioning of pyramids 102, 103 and 104 is not critical for purposes of the present invention, but may be adjusted so as to cover the desired regions.

In addition to pyramids 102, 103 and 104, and detectors 102a, 103a and 104a, the receiver unit of FIG. 1 may also include a lens 105, as well as a detector 105a associated with lens 105. In a preferred embodiment, lens 105 may be a wide-angle hemispherical lens suitable for focusing light received from any point surrounding the lens 105 onto detector 105a. For example, lens 105 may comprise a wide-angle lens available from Inventio Software of Great Britain (address: Inventio Software, #1 New Villas, Crowthorne Road, Bracknell, BERKS RG12 4EG, GREAT BRITAIN; telephone number: (0344) 57-057), or any equivalent wide-angle lens capable of collecting transmitted signals over a wide angular range. Like detectors 102a, 103a and 104a, detector 105a may comprise, in a preferred embodiment, part number BPW41N available from National Semiconductor, or an equivalent.

Because light may be transmitted to and received by one or more of detectors 102a, 103a, and/or 104a, or by none of these detectors, detector 105a is provided in order to detect when light is received from any region. In this way, whether or not one or more of detectors 102a, 103a or 104a receive light, detector 105a detects the transmitted light.

In addition to a wide angle lens, reference numeral 105 may comprise any other component which may act to focus light from a wide angular range onto detector 105a. For example, a series of mirrors or an angular range limiting lens may be utilized in order to perform this function.

In a further embodiment of the present invention, shade 106 may be provided connected to or near one or more of pyramids 102, 103 and/or 104. Shade 106 is provided in order to reduce the effects of ambient light found in the environment surrounding the receiver unit. For example, overhead lighting within a room where the receiver unit is operating may provide a certain amount of infra-red light, which may cause one or more of the detectors 102a, 103a and/or 104a to be falsely triggered. Because pyramid 104 is positioned facing upwards in a preferred embodiment, shade 106 may be attached to one of the outward facing edges of pyramid 104 in order to block a substantial amount of such ambient light. However, shade 106 may be positioned to extend away from the opening of pyramid 104 so as to allow light from transmitted from the remote unit to enter pyramid 104 and be detected by detector 104a. In an alternate embodiment, shade 106 may take the form of any other type of ambient light reducer, including electronic circuitry (not shown) to perform this function.

The receiver unit shown in FIG. 1 is merely one of a variety of configurations which are possible according to the present unit. It will be understood by one of ordinary skill in the art that pyramids 102, 103 and 104 may be assembled in a multitude of ways, and the configuration shown in FIG. 1 is provided merely for illustrative purposes only. Additionally, the components shown in FIG. 1 may be interconnected in many different ways. For example, pyramids 102, 103 and 104 may be connected to one another and to housing 101 via adhesive or a plastic molding, and detectors 102a, 103a and 104a may be connected to their respective pyramids 102, 103 and 104a, respectively, also via adhesive or a plastic molding.

Figure 2A:
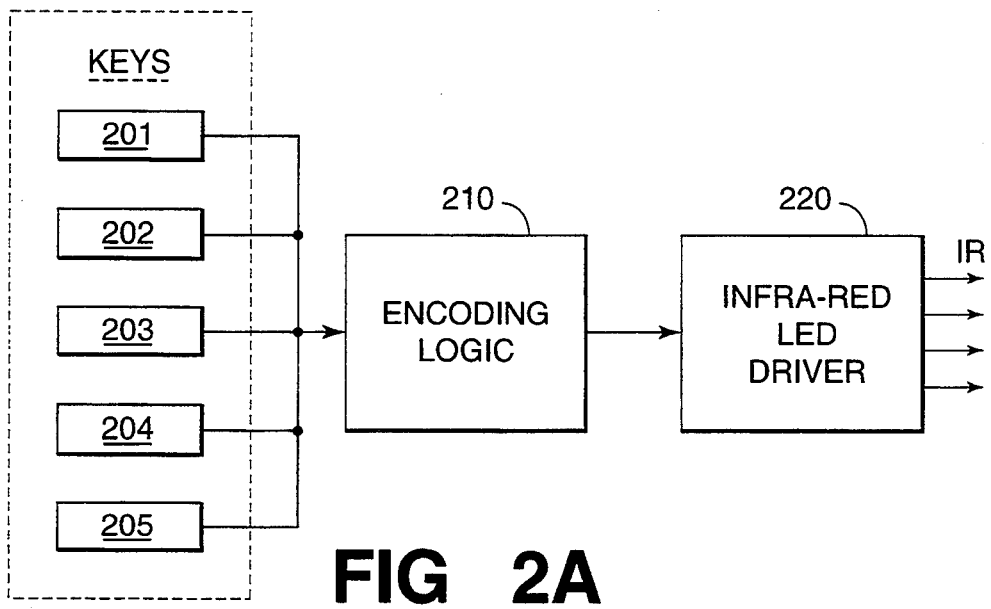
FIG. 2(a) is a block diagram depicting the major components of a remote unit transmitter in accordance with a preferred embodiment of the present invention.

Referring to FIG. 2(a), a block diagram of a remote unit transmitter is depicted. Push switches (keys) 201-205 are provided in order to provide input to encoding logic 210, which determines which switch 201-205, if any, have been pressed. Particularly, in a preferred embodiment, switches 201-205 may comprise conventional push-button switches which, when pushed, close an electrical connection. For example, each switch 201-205 may comprise part number 320871, available from RS Components of Great Britain (address: RS Components, Ltd., PO Box 99, Corby, NORTHANTS NN17 9RS, GREAT BRITAIN; telephone number: (0536) 201234). Of course, other equivalent switches may be utilized instead of switches 201-205, as will be recognized by one of ordinary skill in the art.

Switches 201-205 (or additional switches which also me be utilized) are provided to provide a means for the user of the remote unit to control the video game, or other controllable system, for which purpose of the present invention is implemented. For example, the present invention may be utilized to control the previously-discussed video game where a video image of a "person" may be controlled. In this case, one of the switches may correspond to a "jump" command, whereby the "person" will "jump" when this switch is depressed. Further, the other switches may control other actions which the user may direct the "person" o take. Of course, the functionality of the switches may be entirely a function of the particular game being played.

While any number of switches 201-205 may be used according to the present invention, in a preferred embodiment, five switches 201-205 are used. Four of these switches correspond to functional keys the activation of which may cause a particular kind of action to occur on the video game system. The last switch corresponds to a type of "shift" key, the activation of which causes a different set of functions to be associated with the first four switches. Thus, through the selective use of the "shift" key, eight different switches may be implemented, with each of the four functional switches having to functions associated therewith.

Figure 3A:
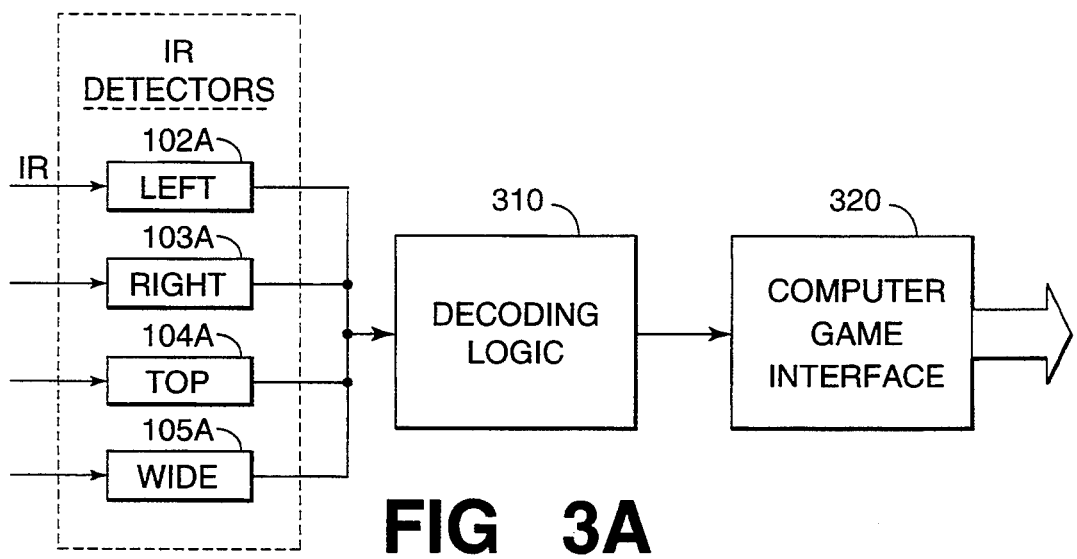
FIG. 3(a) is a block diagram depicting the major components of a receiver unit for receiving the signals transmitted from the remote unit transmitter of FIG. 1, in accordance with a preferred embodiment of the present invention.
Figure 3B:
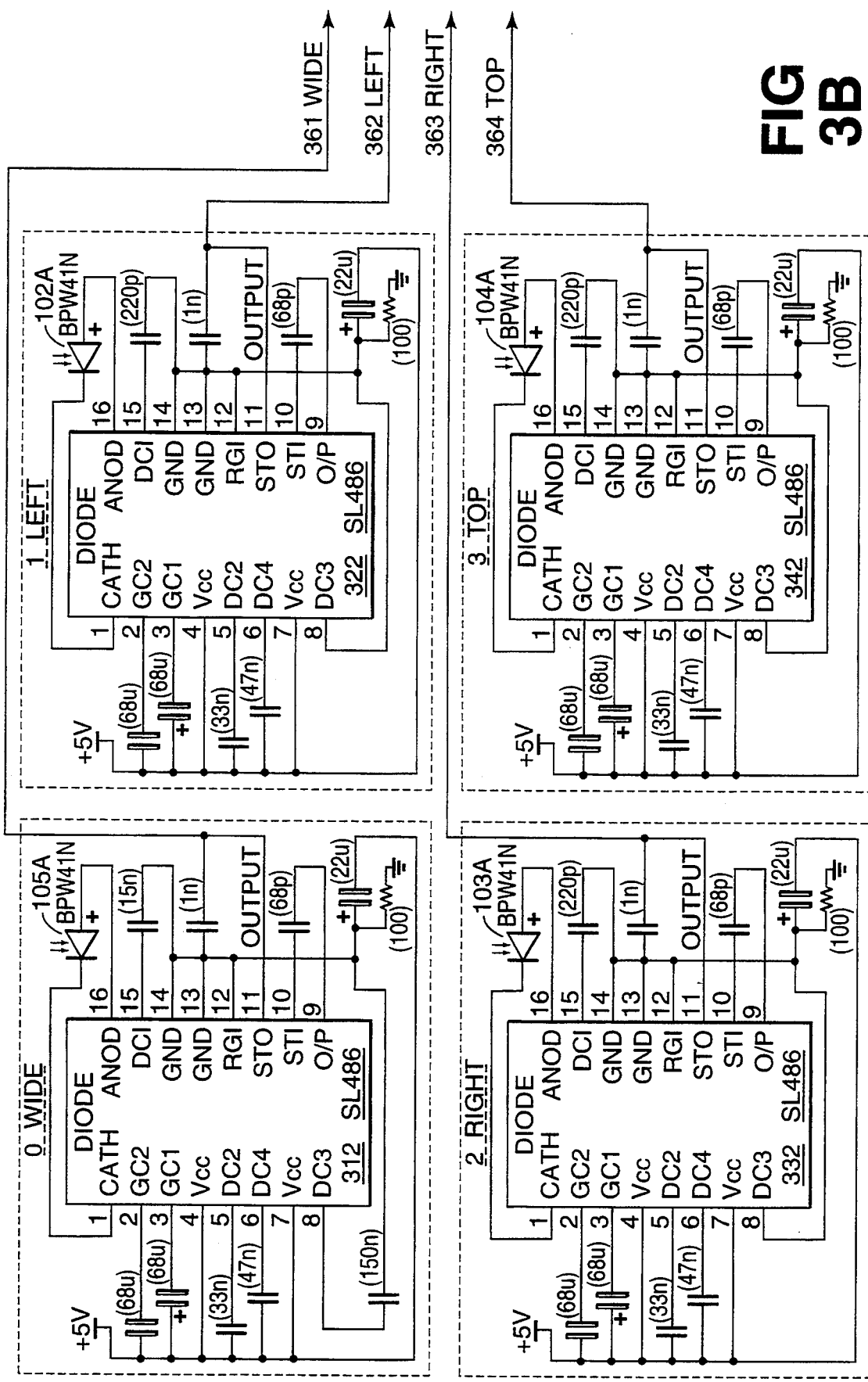
FIGS. 3(b) and 3(b) are schematic diagrams of the receiver unit depicted in FIG. 3(a).

Specifically, switch 205 may be the switch assigned as the "shift" key. When the receiver unit depicted in FIGS. 3(a) and 3(b) are in the "NORMAL" operating mode (described in further detail below), switches 201-204 may correspond to the "A" "B" "Right" and "Left" buttons, respectively, on a normal Nintendo Entertainment System (NES) control pad, when switch 205 is not activated (e.g., unshifted). When switch 205 is activated (e.g., shifted), switches 201-204 may correspond to the "Start", "Select", "Up" and "Down" buttons, respectively, on a normal NES control pad.

When the receiver unit is in the "JIVE" operating mode (described below), switches 201-204 may correspond to the On-Normal, On-Boost, On-Normal and On-Boost buttons, respectively, on the NES control pad, when switch 205 is not activated (e.g., unshifted). When switch 205 is activated (e.g., shifted), switches 201-204 may correspond to the "Start" "Select" "Up" and "Down" buttons, respectively, on a normal NES control pad. When the "JIVE" mode is activated, the "Left", "Right" and "Up" buttons are also controlled via the angular position detecting feature of the present invention, as will be described in further detail below.

Of course, other suitable combinations and permutations for these switches may also be utilized, and the present configuration is merely presented as a preferred embodiment for use on the NES.

Encoding logic 210 responds to the press of switches 201-205 by encoding this information into a form suitable for transmission by infra-red LED driver 220. Particularly, encoding logic 210 may encode the particular switch(es) 201-205 pressed into a serial bit stream, wherein a bit of the bit stream corresponds to one of the switches 201-205. This bit stream may be input into Infra-red LED driver 220, which in turn causes infrared LEDs 231-235 to transmit the bit stream.

Figure 2B:
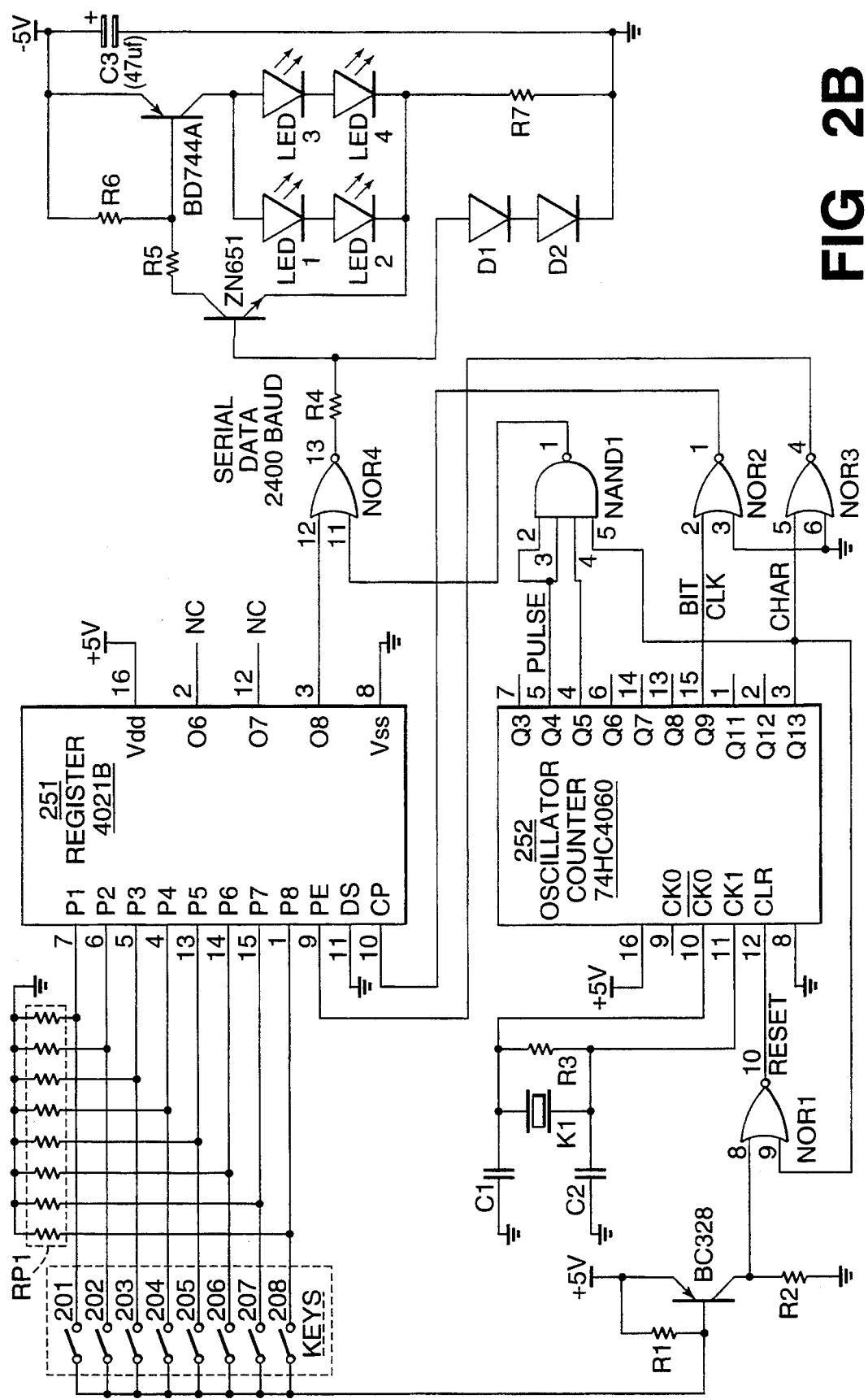
FIG. 2(b) is a schematic diagram of the remote unit transmitter depicted in FIG. 2(a).

The circuitry which may be used in one embodiment of the present invention is depicted in the schematic diagram of FIG. 2(b), discussed below. Several components are shown in FIG. 2(b) for implementing the functionality of the remote unit of FIG. 2(a). It will be readily understood that FIG. 2(b) discloses merely a preferred embodiment of the present invention, and that other suitable remote unit configurations may be employed as well.

For purposes of the present description of FIG. 2(b), all of the components, including the integrated circuits, are available from National Semiconductor Corporation, and are also available from Motorola, Inc., and Signetics Corporation. The part numbers listed are those of National Semiconductor, unless otherwise indicated.

Referring to FIG. 2(b), the remote unit of the present embodiment includes a serial shift register 251 and a crystal oscillator/14 stage counter (oscillator/counter) 252, both of which may be powered via a power supply voltage of +5V between pins 16 and 8. Serial shift register 251 may comprise part number 4021B, and oscillator/counter 252 may comprise part number 74HC4060.

Connected to the input pins P1 through P8 of serial shift register 251 are eight electrical switches (keys), labelled 201 through 208 in FIG. 2(b). While eight switches 201-208 are shown, in a preferred embodiment, only five of these switches are utilized. Particularly, switches 201-205 are the same switches 201-205 depicted in FIG. 2(a), which serve as input into encoding logic 210. Of course, any number of switches could be utilized, depending upon the number of functions which the user may have control over. In the present embodiment, eight switches are supported, but additional circuitry may readily be added to support additional switches.

When switches 201-208 are not activated (i.e., when the switches are not closed), pins P1-P8 of serial shift register 251 are biased to ground via eight pull-down resistors RP1. In one embodiment, each of these resistors may comprise a 100 KΩ resistor, and each of these resistors may either be discrete or packaged as a suitable resistor array.

When one or more of switches 201-208 are closed, the corresponding pin(s) P1-P8 are connected to the base of transistor BC328 (available from Signetics). A 47 KΩ resistor R1 is connected between the base and emitter of transistor BC328, and a 10 KΩ resistor R2 is connected between the collector of transistor BC328 and ground. The emitter of transistor BC328 is also connected to the power supply voltage of +5V.

The collector of transistor BC328 is connected as output to one of the inputs of NOR gate NOR1, which may comprise part number 74HC02. The other input of NOR1 is connected to terminal Q13 of oscillator/counter 252. The output of NOR1 is in turn connected to the CLR terminal of oscillator/counter 252.

In order for oscillator/counter 252 to oscillate at the appropriate frequency, additional circuitry is provided. Specifically, capacitors C1 and C2, each being rated at 22 pFarad (pF) are connected to opposite terminals of crystal K1, respectively, and 47 MΩ resistor R3 is connected between the opposite terminals of crystal K1. The opposite terminals of crystal K1 are in turn connected to terminals CK0 and CK1 of oscillator/counter 252. In a preferred embodiment, crystal K1 is chosen so as to oscillate at 2.4576 MHz.

Terminals Q9 and Q13 of oscillator/counter 252 are each connected to one of the input terminals of NOR gates NOR2 and NOR3 (both part number 74HC02), respectively. The other input terminals of each of NOR2 and NOR3 are connected to ground. The output of NOR2 is connected to terminal CP of serial shift register 251, and the output of NOR3 is connected to terminal PE of serial shift register 251.

Terminals Q4, Q5 and Q13 of oscillator/counter 252 are connected to the input terminals of NAND gate NAND1 (part number 4012). Because this part number has four inputs, terminal Q5 may also be connected to the fourth input terminal of NAND1. The output of NAND1 is connected to one of the input terminals of NOR gate NOR4, and the other input terminal of NOR4 is connected to terminal 08 of serial shift register 251.

The output terminal of NOR4 is connected through 560 Ω resistor R4 to the base of transistor ZN651. The base of transistor ZN651 is also connected to ground serially through diodes D1 and D2, which may each comprise part number 1N4148. The collector of transistor ZN651 is connected through 100 Ω resistor R5 to the base of transistor BD744A. The base and emitter of transistor BD744A are connected together through 1 KΩ resistor R6, and the emitter of transistor BD744A is also connected to power supply voltage +5V.

The collector of transistor BD744A is connected to the anodes of infra-red light-emitting diodes (LEDs) LED1 and LED3. The cathode of LED1 is connected to the anode of LED2, and the cathode of LED3 is connected to the anode of LED4. Finally, both the cathodes of LED2 and LED4 are connected to ground through 62 Ω resistor R7. The cathodes of LED2 and LED4 are also connected to the emitter of transistor ZN651. LED1-LED4 all may comprise part number TSUS5402, manufactured by Hewlett-Packard Corporation. Finally, the positive terminal of electrolytic capacitor C3 is connected to the power supply +5V, and the negative terminal of capacitor C3 is connected to ground.

Figure 4:
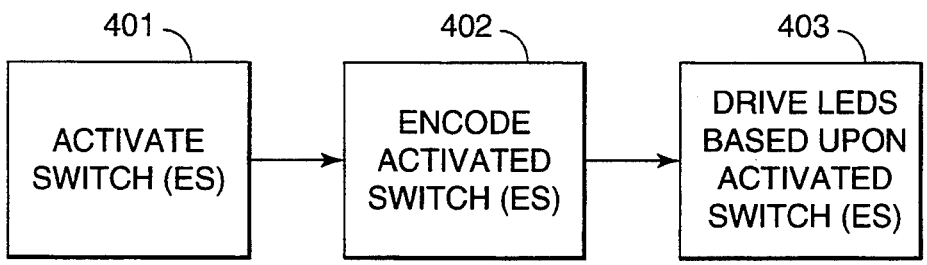
FIG. 4 is a flow diagram showing the various steps executed by the remote unit of FIGS. 2(a) and 2(b), in accordance with a preferred embodiment of the present invention.

The operation of the remote unit of FIG. 2(b) will now be described with respect to the flow diagram of FIG. 4.

In operation, the remote unit transmitter sends pulses of infra-red light corresponding to which of the switches 201-208 are activated. Particularly, when one or more of switches 201-208 are activated by the user of the remote unit (i.e., by pressing on one or more of the switches of the remote unit) in step 401 of FIG. 4, one or more of the corresponding terminals P1-P8 of serial shift register 251 are connected to the base of transistor BC328. The base of transistor BC328, normally pulled high to the +5V level by resistor R1, is pulled low to near the ground level by the respective resistor of resistors RP1. Due to the voltage drop across the emitter and collector of transistor BC328, this transistor is activated, and the voltage at the collector goes high. Because terminal Q13 of oscillator/counter 252 is initially in a low position at this point, only when the voltage at the collector of transistor BC328 goes high does the output of NOR1 goes low. This causes the terminal CLR of oscillator/counter 252 to go low.

Once terminal CLR goes low, the counting sequence begins in oscillator/counter 252, at which point terminal Q13 of oscillator/counter goes high. When terminal Q13 goes high, terminal PE of serial shift register 251 goes low (due to NOR3), and the state of terminals P1-P8 of shift register 251 are latched into shift register 251.

As oscillator/counter 252 counts, terminal Q9 clocks a new bit out of serial shift register onto terminal 08 on each falling edge. This occurs because the output of terminal Q9 goes through NOR2 (acting as an inverter), thereby providing an inverted signal to terminal CP of serial shift register 251. The new bit is provided by serial shift register 251 to one input terminal of NOR4.

As previously described, terminals Q4, Q5 and Q13 of oscillator/counter 252 are provided as input to NAND1. The output of NAND1 is provided to the other input terminal of NOR4. In this configuration, if terminal 08 of serial shift register 251 is low, then the output of NOR4 is pulsed sixteen times, before the next bit is shifted out at terminal O8. This occurs because the output of NAND1 controls the pulsing of NOR4, given that the output of terminal O8 of serial shift register is low. If terminal O8 of serial shift register 251 is high, then the output of NOR4 remains low, and this output is not pulsed.

After the current bit clocked onto terminal O8 of serial shift register 251 has been processed (by either pulsing the output of NOR4 16 times, or by keeping the output of NOR4 low during this time), terminal Q9 of oscillator/counter 252 clocks a new bit onto terminal O8 of serial shift register 251. After this occurs, terminals Q4, Q5 and Q13 cause NAND1 to repeat the steps above, whereby the output of NOR4 is either pulsed 16 times (if terminal O8 of shift register 251 is low) or the output of NOR4 remains low (if terminal O8 is high).

Figure 3C:
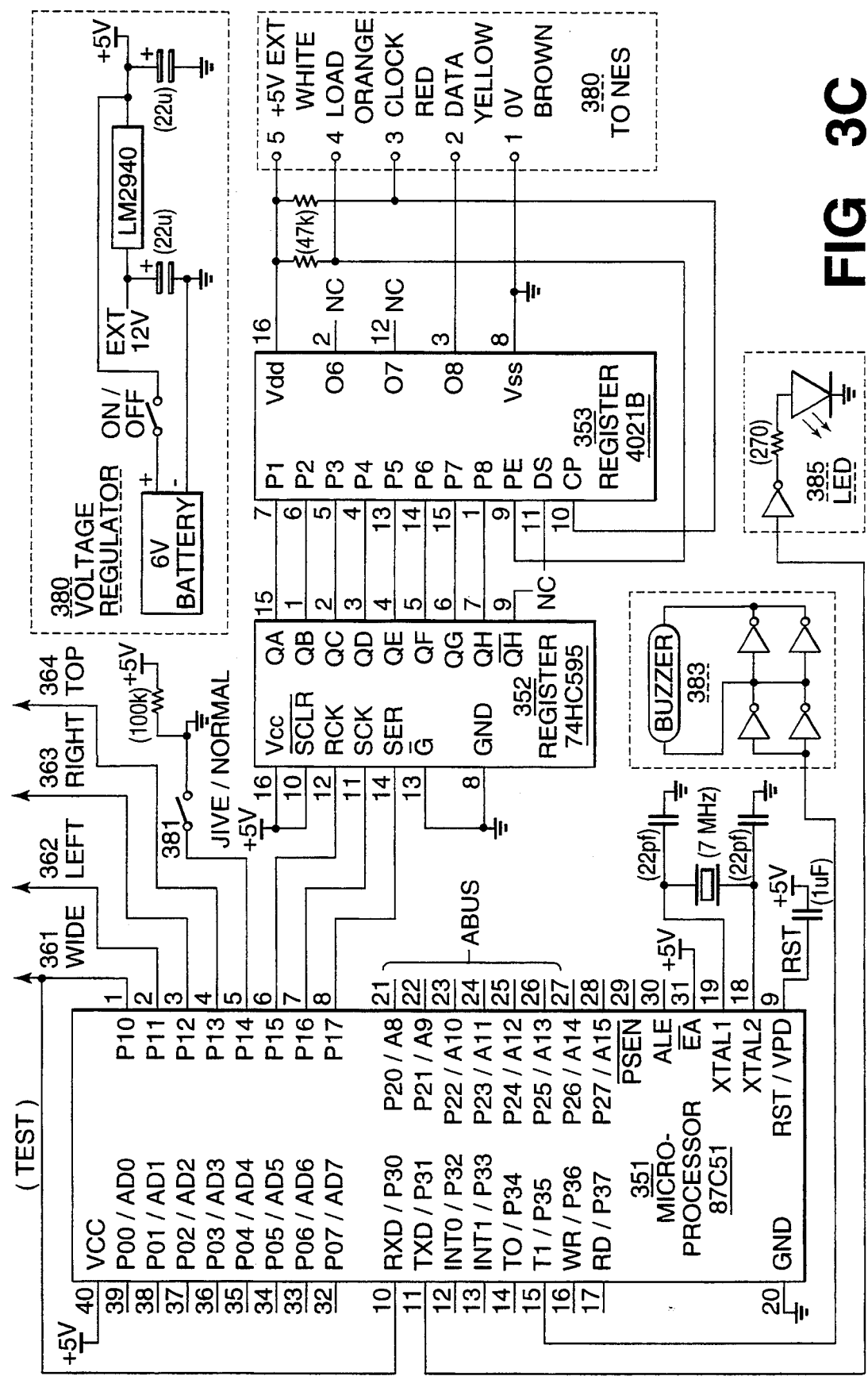

In a preferred embodiment, capacitors C1 and C2, resistor R3 and crystal K1 are chosen such that the oscillator/counter 252 causes LED1-LED4 to transmit a serial bit stream to the receiver unit of FIGS. 3(b) and 3(c) at 2400 bits/second. The data transmitted by the remote unit via LED1-LED4 includes one start bit, 8 data bits and 7 stop bits. The 7 stop bits are included to allow for rapid synchronization by the receiver unit to the start of the transmitted characters. Particularly, the 1 low start bit and 7 stop bits are placed into the pulse train by alternately enabling and disabling the pulse train via terminal Q13 of oscillator/counter 252.

As can be seen from the previous description, the output of NOR4 corresponds to the information which is to be transmitted by the remote unit of FIG. 2(b). Accordingly, the output of NOR4 is coupled to the remainder of the circuit for transmitting the infra-red signals from the remote unit. Thus, the circuitry between the switches 201-208 and up to and including NOR4 can be seen to correspond to encoding logic 210 depicted in the block diagram of FIG. 2(a), and serves to encode the switches 201-208 activated in step 401 of FIG. 4. The encoding of switches 201-208 as previously described is illustrated as step 402 in FIG. 4.

In a preferred embodiment, all of switches 201-208 may not be needed by a user of the present invention. In this case, terminal P8 of serial shift register 251 may be held permanently "off". Of course, it will be readily apparent to one of ordinary skill in the art than any number of switches 201-208 may be utilized with the present invention, and the present invention will be seen to not be limited in this respect.

The operation of the remainder of the circuit will now be described. Specifically, when the output of NOR4 is at a logic high level, the voltage at this output is applied to the base of transistor ZN651 through resistor R4. Because the emitter of transistor ZN651 is connected to ground through resistor R7, pulling the base of this transistor high activates the transistor, thereby allowing current to flow from the collector to the emitter. This, in turn, causes the voltage at the base of transistor BD744A to drop, which activates transistor BD744A, thus allowing current to flow from the emitter to the collector of transistor BD744A. The current flows out of the collector of transistor BD744A, and through the infra-red LEDs (LED1-LED4), thereby activating LED1-LED4. The circuitry situated after the output of NOR4 can therefore be considered to correspond to infra-red drivers and associated infra-red LEDs depicted as reference numeral 220 in FIG. 2(a). The driving of LED1-LED4 based upon the encoding logic is also depicted as step 403 in FIG. 4.

A block diagram corresponding to the receiver unit of the present invention is shown in FIG. 3(a). This receiver unit corresponds to the receiver unit shown in and described with respect to FIG. 1. That is, the block diagram of FIG. 3(a) (and the schematic diagram shown in FIGS. 3(b) and 3(c), to be described below) make up the receiver unit of FIG. 1.

Referring to FIG. 3(a), four infra-red detectors 102a, 103a, 104a and 105a are depicted which may detect infra-red signals transmitted from an external source, such as the remote unit shown in FIGS. 2(a) and 2(b). These infra-red detectors correspond to the same detectors depicted in FIG. 1. That is, infra-red detector 102a of FIG. 3(a) corresponds to detector 102a within pyramid 102 of FIG. 1. Likewise, infra-red detectors 103a, 104a and 105a of FIG. 3(a) correspond to detectors 103a, 104a and 105b, respectively, of FIG. 1.

As shown in FIG. 3(a), the output of detectors 102a, 103a, 104a and 105a are coupled to decoding logic 310, which decodes the signals received by these detectors. The output of decoding logic 310 is thereafter provided to computer game interface 320. As its name implies, computer game interface 320 acts as an interface between the signals provided by decoding logic 310 which correspond to the signals received by the detectors, and the host computer game with which the present invention may operate. The receiver unit of FIG. 3(a) is described in further detail below with respect to the schematic diagram of FIGS. 3(b) and 3(c).

Referring to FIGS. 3(b) and 3(c), the receiver unit of FIG. 3(a) is shown in further detail, and with the particular components which comprise a preferred embodiment. Infra-red detector diodes 102a, 103a, 104a and 105a are shown which correspond to like-numbered components of FIG. 3(a) and FIG. 1. As previously described, in a preferred embodiment, detectors 102a, 103a, 104a and 105a may each comprise part number BPW41N available from National Semiconductor, or an equivalent thereof, and these detectors may be mounted as shown in FIG. 1, or in any other suitable configuration.

As shown in FIGS. 3(b) and 3(c), the output of detectors 102a, 103a, 104a and 105a are each amplified and demodulated by, for example, an SL486 integrated circuit, shown as reference numerals 322, 332, 342 and 312, respectively. These amplifiers provide linear amplification with a high pass characteristic above 2 kHz, and a pulse shaping circuit to produce pulses suitable for decoding by a microprocessor. The automatic gain control (AGC) of these amplifiers may be disabled in a preferred embodiment and the gain reduced to give a maximum sensitivity to signals within the "catchment area" and to give minimum noise pickup of signals outside that area. The "catchment area" is defined as the angular region within which a particular pyramid 102, 103 or 104 may collect the infra-red light signal transmitted from a remote unit. That is, the catchment area is the volume of space bounded approximately by planes drawn through the sides of the pyramid outwardly. Of course, a simpler amplification scheme could be used instead of integrated circuits 322, 332, 342 and 312, but the use of these amplifier is shown in order to depict one embodiment.

The output of each amplifier 322, 332, 342 and 312 is provided at pin 11 (labelled STO) of each of these packages, and is also coupled to pins 12, 13 and 14 of each package through a 1 nF capacitor. Pin 14 of each amplifier is further coupled to pin 15 through a 220 pF capacitor. The output of pin 11 of each amplifier 322, 332, 342 and 312 is further provided at output lines 362, 363, 364 and 361, respectively, and output lines 362, 363, 364 and 361 serve as input to pins 2, 3, 4 and 1 of microprocessor 351. Pins 2, 3, 4 and 1 of microprocessor 351 are also labelled P11, P12, P13 and P10, respectively.

In a preferred embodiment, an 87C51 microprocessor, manufactured by Intel Corporation, is utilized as microprocessor 351. The 87C51 has components to convert outputs from this microprocessor to RS232 voltage levels (a standard), and to allow program development in ChipForth, a powerful software development tool for embedded microcomputer systems. Microprocessor 351 may also comprise an 80C31 microprocessor, which is a similar microprocessor to the 87C51, except that, unlike the 87C51, the 80C31 does not included embedded EPROM and RAM. In a further embodiment, microprocessor 351 may comprise other equivalent microprocessor, such as the PIC16C54, manufactured by Arizona Microchip Technology, Inc. Of course, the native programming language for these other microprocessors may vary depending upon the nature of the microprocessor.

According to the present invention, microprocessor 351 may be programmed in order to decode the signals detected by detectors 102a, 103a, 104a and 105a, and amplified by amplifiers 322, 332, 342 and 312, respectively. Thus, amplifiers 322, 332,342 and 312, as well as microprocessor 351 comprises the decoding logic 310 of FIG. 3(a). The process which microprocessor 351 may be programmed to implement is discussed in further detail below with respect to FIGS. 5(a) and 5(b).

In a prototype version of the receiver unit of the present invention, the output pins of microprocessor 351 are coupled to a serial-in parallel-out shift register 352, which may comprise part number 74HC595 from National Semiconductor, or equivalent. Specifically, pin 6 (labelled "P15" ) of microprocessor 351 may be connected to pin 12 (labelled "RCK") of register 352; pin 7 (labelled "P16" ) of microprocessor 351 may be connected to pin 11 (labelled "SCK" ) of register 352; and pin 8 (labelled "P17" ) of microprocessor 351 may be connected to pin 14 (labelled "SER"). Pin 10 (labelled "SCLR" with an overbar) is connected to pin 16 (labelled "Vcc"), while pin 13 (labelled "G" with an overbar) is connected to pin 8 (labelled "GND").

Pins 15, 1, 2, 3, 4, 5, 6 and 7 (labelled "QA" through "QH") are connected to pins 7, 6, 5, 4, 13, 14, 15 and 1 (labelled "Pi" through "P8") of parallel-in serial-out shift register 353, which may comprise part number 4021B from national Semiconductor, or equivalent. Finally, several pins of register 353 may be connected to the game unit (not particularly shown), or other device which is to be controlled, in order to control the same.

For purposes of example, the present receiver unit may be connected to a Nintendo Entertainment System (NES), which is a popular video game system sold by Nintendo of America. The NES is a multi-purpose video entertainment system which accepts a variety of video game "cartridges" which may be connected to the unit. Each cartridge includes, among other things, read-only memory (ROM), containing software which controls the NES so as to provide an interactive video game which may be at least partially controlled by a user of the video game.

The user of the NES may normally control the "action" occurring within the video game by utilizing a control pad connected to the NES via a number of wires. These wires are connected to the NES via a connector plug coupled to the NES via the pins of one or more game ports. For purposes of the present invention, the various electrical pins of the NES game port are identified by color, as described below with respect to reference numeral 380 of FIG. 3(c).

As shown by reference numeral 380, five separate connections between register 353 and the NES may be utilized, according to a preferred embodiment of the present invention: (1) pin 16 (labelled "Vdd") of register 353 is connected to pin 5 (labelled "+5V Ext White") of the NES; (2) pin 9 (labelled "PE") of register 353 is connected to pin 4 (labelled "Load Orange") of the NES, and is also connected to pin 16 of register 353 via a 4.7 KΩ register; (3) pin 10 (labelled ">CP") of register 353 is connected to pin 3 (labelled "Clock Red") of the NES, and is also connected to pin 16 of register 353 via a 4.7 KΩ resistor; (4) pin 3 (labelled "O8") of register 353 is connected to pin 2 (labelled "Data Yellow") of the NES; and (5) pin 8 (labelled "Vss") of register 353 is connected to pin 1 (labelled "0V Brown") of the NES, and is also connected to ground.

In another embodiment of the receiver of the present invention, such as a production embodiment, register 352 may not be needed. Particularly, as shown in FIG. 3(c), the output of microprocessor 351 is in a serial format, and is connected to register 352, which converts this serial output to a parallel format. Thereafter, register 353 converts the parallel output of register 352 back to a serial format, and provides this serial output to the video game system, for example.

However, if microprocessor 351 is chosen which has enough output pins so as to provide all of the bits at once to register 353, then register 352 would not be necessary, and the parallel output of this microprocessor 351 could be connected directly to register 353, which would thereafter convert the parallel output of microprocessor 351 into a serial format to provide to the video game system. Of course, further variations on this theme are possible, and the present invention should not be deemed to be limited by the particular arrangement shown in FIGS. 3(b) and 3(c).

In addition to lines 361-364, microprocessor 351 also receives input from an additional line at pin 5 (labelled "P14"). Particularly, pin 5 is connected to ground through a 100 KΩ resistor and switch 381 connected in series. Microprocessor 351 is thus able to detect whether switch 381 is closed depending upon the voltage level supplied at pin 5. If switch 381 is closed, ground voltage level is supplied at pin 5, whereas if switch 381 is open, pin 5 is not specifically connected to any voltage potential, thereby being pulled up at or near the +5V level.

The purpose of switch 381 is to provide a means for operating the present invention in one of two modes. In a preferred embodiment, if switch 381 is closed, then the angular location sensing function of the present invention is active, and the receiver unit provides the video game system (or other system) with signals based upon the angular location of the remote unit when a signal is transmitted from the remote unit (hereinafter referred to as "JIVE Mode"). On the other hand, if switch 381 is open, the angular location determining feature of the present invention is disabled, and only the actual buttons pressed on the remote unit are relayed by the receiver unit to the video game system (hereinafter referred to as "Normal Mode"). The particular functionality of the receiver unit responsive to switch 381 and the signals received from the remote unit are handled by microprocessor 351, as described below.

The operation of the receiver unit of FIGS. 3(b) and 3(c) will now be described with respect to the flow diagrams of FIGS. 5(a) and 5(b).

Figure 5A:
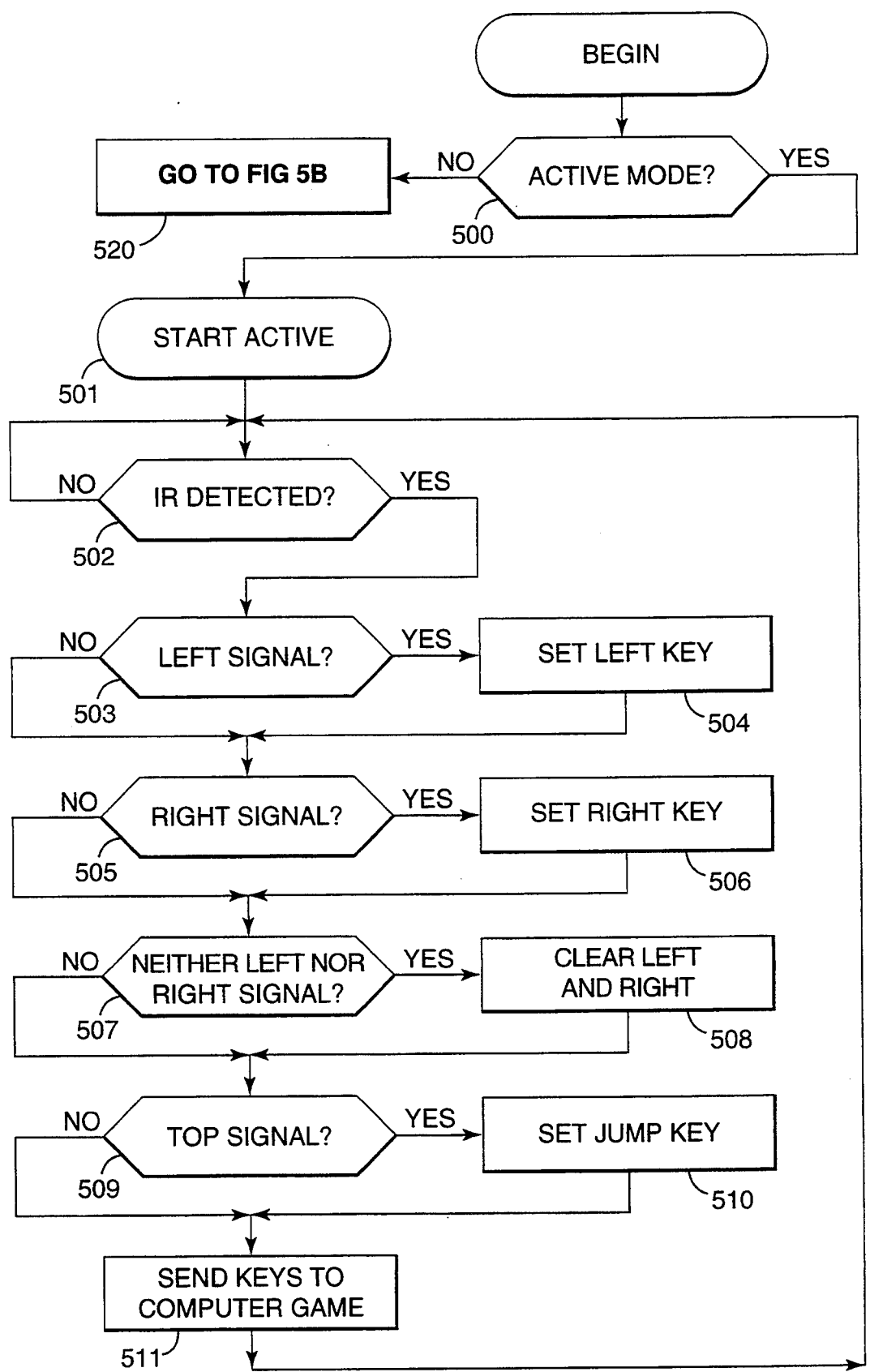
FIGS. 5(a) and 5(b) are flow diagrams showing the various steps executed by the receiver unit of FIGS. 3(a) and 3(b), in accordance with a preferred embodiment of the present invention.
Figure 5B:
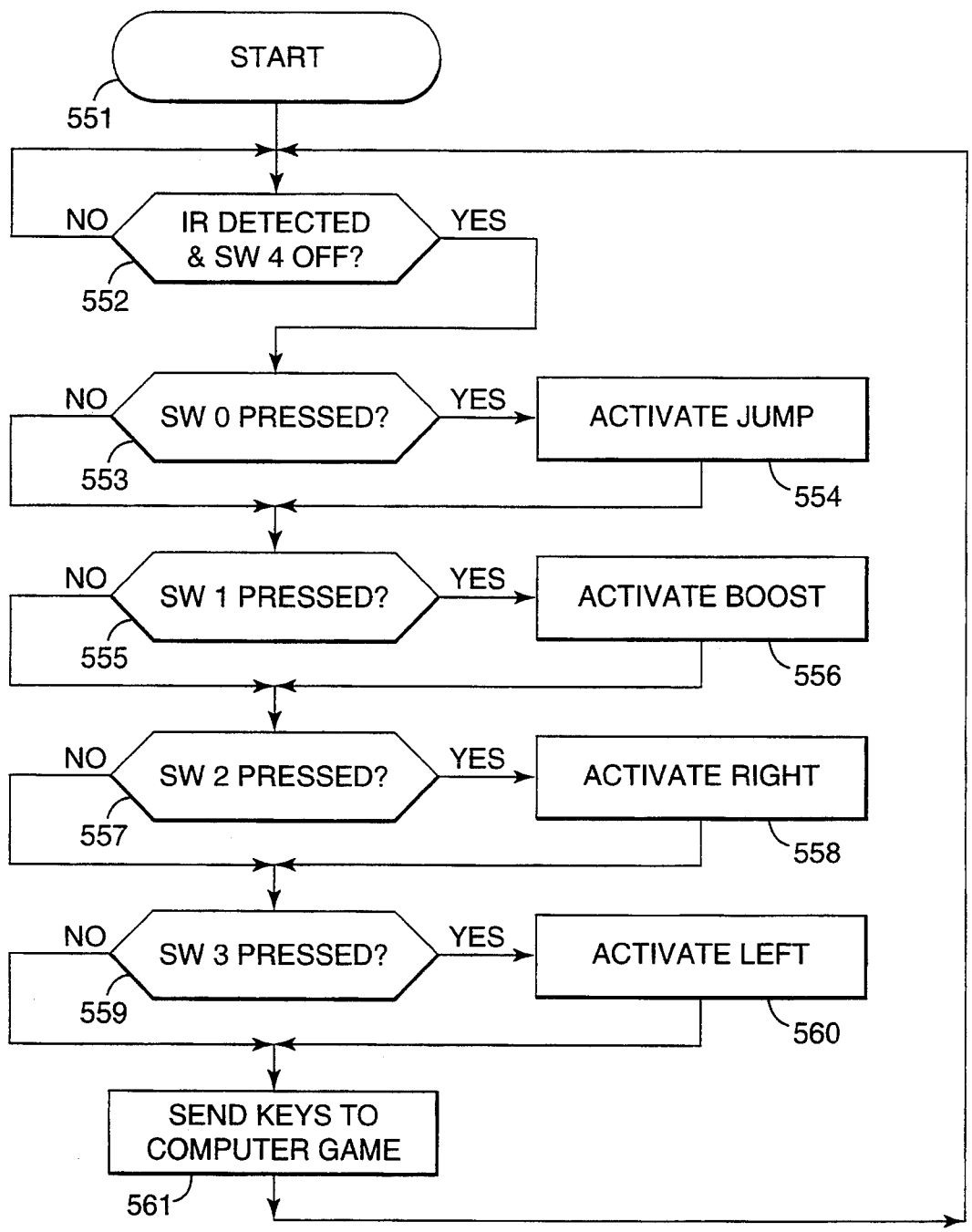

Referring to FIGS. 5(a) and 5(b), flow diagrams are provided which depicts the general steps which may be taken by microprocessor 351 and the receiver unit of FIGS. 3(b) and 3(c) in order to implement the present invention. First, in steps 500–501, microprocessor 351 determines whether the receiver unit is in JIVE Mode or Normal Mode; that is, whether the receiver unit is to determine the angular location of the remote unit when forwarding the signals received from the remote unit to the video game system, or whether the receiver unit is to merely forward the signals received from the remote unit to the video game system. Microprocessor may determine whether the receiver unit is in JIVE or Normal Mode based upon the state of pin 4, as described previously.

If the receiver unit is in the JIVE Mode, then the process shown in the remainder of FIG. 5(a) is initially executed by microprocessor 351. In step 502, microprocessor 351 may determine whether an infra-red signal has been detected by infra-red detectors 102a, 103a, 104a and 105a (FIG. 3(b)). In a preferred embodiment, microprocessor 351 may read its incoming ports at pins 2, 3 and 4 (corresponding to lines 362 (left detector), 363 (right detector) and 364 (top detector)) repeatedly 255 times (over a 16 msec interval). Microprocessor 351 may then total up the number of times that each of these bits is high (+5V) or low (ground), and store these totals in internal registers corresponding to each of these three detectors. For example, eight internal registers may be used, two registers for each detector. The first register may be used to keep track of the number of detections of a high bit, while the second may be used to keep track of detections of a low bit.

In order to determine whether one of the infra-red detectors 102a, 103a and/or 104a have detected a signal from the remote unit, a minimum threshold may be specified with respect to the internal registers for each detector. In the preferred embodiment, it has been determined that at least 2 pulses to 14 spaces need to be detected, which gives a nominal minimum ratio of 1 in 7. In order to give a true reading whether more than 70% of the signal is detected, a best ratio has been found to be 1 in 10.

Therefore, in step 503, if a signal pulse is detected in one out of 10 spaces for the left detector 102a (on line 362), then it is determined that the remote unit is within the detection angular range of detector 102a, and step 504 is encountered. In step 504, the bit (e.g., a flag) corresponding to the left key (which is transmitted to the video game system, and which is described in further detail below) is set, and the process continues at step 505.

In step 505, if a signal pulse is detected in one out of 10 spaces for the right detector 103a (on line 363), then it is determined that the remote unit is within the detection angular range of detector 103a, and step 506 is encountered. In step 506, the bit corresponding to the left key (which is transmitted to the video game system, and which is described in further detail below) is set, and the process continues at step 507. In step 507, if neither left nor right signal is detected as described above, then both bits corresponding to the left and right keys are cleared, and step 509 is encountered.

In step 509, if a signal pulse is detected in one out of 10 spaces for the top detector 104a (on line 364), then it is determined that the remote unit is within the detection angular range of detector 104a, and step 510 is encountered. In step 510, the bit corresponding to the top (also called the jump key) key (which is transmitted to the video game system, and which is described in further detail below) is set, and the process continues at step 511. Finally, in step 511, the bits which are set above are transmitted to the computer video game system, and the process is repeated at step 502.

If the receiver unit is in the Normal Mode, then step 500 of FIG. 5(a) causes step 520 to be executed. Step 520 merely indicates that the process shown in FIG. 5(b) is executed by microprocessor 351.

Referring to FIG. 5(b), after the Normal mode is entered at step 551, at step 552 microprocessor 351 may determine whether an infra-red signal has been detected by infra-red detectors 102a, 103a, 104a and 105a (FIG. 3(b)), and whether switch 205 (the shifting switch/key) has been activated. With respect to the determination as to whether an infra-red signal has been detected by the infra-red detectors, a similar process as that used in step 502 of FIG. 5(a) may be implemented. That is, in a preferred embodiment, microprocessor 351 may read its incoming ports at pins 2, 3 and 4 (corresponding to lines 362 (left detector), 363 (right detector) and 364 (top detector)) repeatedly 255 times (over a 16 msec interval). Microprocessor 351 may then total up the number of times that each of these bits is high (+5V) or low (ground), and store these totals in internal registers corresponding to each of these three detectors. For example, eight internal registers may be used, two registers for each detector. The first register may be used to keep track of the number of detections of a high bit, while the second may be used to keep track of detections of a low bit.

In order to determine whether one of the infra-red detectors 102a, 103a and/or 104a have detected a signal from the remote unit, a minimum threshold may be specified with respect to the internal registers for each detector. In the preferred embodiment, it has been determined that at least 2 pulses to 14 spaces need to be detected, which gives a nominal minimum ratio of 1 in 7. In order to give a true reading whether more than 70% of the signal is detected, a best ratio has been found to be 1 in 10.

If an infra-red signal is detected and switch 205 has not been activated, then step 553 is encountered; otherwise, the determination of step 552 is encountered again.

In step 553, if switch 201 (corresponding to the "A" button on a normal NES control pad) is activated (e.g., pressed), then step 554 is encountered. In step 554, the bit corresponding to the "A" button (commonly used as a "jump" switch in many video games) is set, and the process continues at step 555.

In step 555, if switch 202 (corresponding to the "B" button on a normal NES control pad) is activated, then step 556 is encountered. In step 556, the bit corresponding to the "B" button (e.g., commonly used as a "boost" button in many video games) is set, and the process continues at step 557.

In step 557, if switch 203 (corresponding to the "Right" button) is activated, then step 558 is encountered. In step 558, the bit corresponding to the "Right" button (commonly used to move right in many video games) is set, and the process continues at step 559.

Finally, in step 559, if switch 204 (corresponding to the "Left" button) is activated, then step 560 is encountered. In step 560, the bit corresponding to the "Left" button (commonly used to move left in many video games) is set, and the process continues at step 561.

In step 561, the bits which are set above are transmitted to the computer video game system, and the entire process is repeated at step 552.

The transmission of the appropriate control bits to the computer video game (or other controlled device) in steps 511 and 552 may be accomplished in a variety of manners, depending upon the requirements of the video game (or other controlled device). For example, with respect to the situation where the video game is a Nintendo Entertainment System (NES), the following steps may be performed in order to transmit the data bits to the NES:

A. The microprocessor 351 calculates one 8-bit byte which contains one bit for each of the 8 possible keys on the regular Nintendo handset.

B. This byte is clocked into the register 352.

C. The 8 bits appear on the parallel outputs (pins 15 and 1-7, labelled "QA" to "QH") of register 352, which are connected to the parallel inputs (pins 7, 6, 5, 4, 13, 14, 15 and 1, labelled "P1" to "P8") of register 353. The parallel outputs of register 352 correspond exactly to the keys which could be pressed on a regular Nintendo handset.

D. Shift register 353 is used in the same way as it is used in a regular Nintendo handset. Particularly, it shifts each of the 8 bits out to the NES via connectors 380.

Step B above, where the byte from microprocessor 351 is clocked into register 352, operates as follows:

1. Bit 0 of the 8 bit byte to be sent to the NES (the control byte) is tested by microprocessor 351. If bit 0 is high, microprocessor 351 provides a high level on its pin 8 (labelled "P17"). If bit 0 is low, microprocessor 351 provides a low level on pin 8.

2. Microprocessor 351 provides a pulse on its pin 7 (labelled "P16"), which is applied to pin 11 (labelled "SCK") of register 352.

3. Steps 1 and 2, above, are repeated for the remaining bits of the 8 bit byte, until all bits have been sent.

4. Microprocessor 351 provides a pulse on its pin 6 (labelled "P15"), which is applied to pin 12 (labelled "RCK") of register 352. This loads the serially shifted data into the parallel output port of register 352.

In a preferred embodiment, the functionality described above with respect to FIGS. 5(a) and 5(b) may be implemented in the native machine language associated with microprocessor 351. For example, if microprocessor 351 is an 87C51 or 80C31 microprocessor, then this functionality may be implemented in the Chip-Forth language, while PIC16C54 assembly/machine language may used for a PIC16C54 microprocessor.

Referring still to FIG. 3(c), two additional components will now be described which may be incorporated into the receiver in a preferred embodiment. First, buzzer 383 may be included in the receiver in order to provide an audible indication as to certain events which might occur which operating the receiver unit. Buzzer 383 may include a series of four inverters as shown in FIG. 3(b). Buzzer 383 may, for example, be connected to microprocessor 351 via pin 15 (labelled "T1/P35"), and may be activated under control of the software running on microprocessor 351.

In one embodiment, microprocessor 351 may activate buzzer 383 by providing a voltage to buzzer 383. Such activation may occur, for example, when the receiver unit is operating in JIVE Mode (as determined by switch 381) yet none of detectors 102a, 103a, or 104a detect a signal from the remote unit, while detector 105a does. This type of error would correspond to the situation where the angular location of the remote unit would not be able to be determined.

LED assembly 385 may also be included in order to provide a visual indication as to the status of the receiver unit. For example, LED assembly 385 may be activated when power is supplied to the receiver unit, or when, as described above with respect to buzzer 383, the receiver unit is unable to determine at what angular position the remote unit is positioned.

In addition to buzzer 383 and LED assembly 385, a voltage regulator 370 may be utilized in the receiver unit of FIGS. 3(b) and 3(c) in order to assure that an adequate power supply voltage is provided to all of the components. In a preferred embodiment, the receiver unit may be powered by using a six-volt battery, such as part number 594612, available from RS Components. The positive and negative terminals of the six-volt battery are switchably connected as shown in FIG. 3(c) to a voltage regulator, such as an LM2940, manufactured by National Semiconductors, and two 22uF capacitors, manufactured by, for example, Kyocera of Japan. An external 12V power supply source may also be used, with the end result of any configurations being that a regulated +5V level is provided to each of the respective components, as shown in FIG. 3(b) and 3(c). The ground level thus becomes a voltage relative to the +5V supplied voltage.

What has been described above are preferred embodiments of the present invention. It is of course not possible to describe every conceivable combination of components for purposes of describing the present invention, but one of ordinary skill in the art will recognize that many further combinations and permutations of the present invention are possible. All such possible modifications are to be included within the scope of the claimed invention, as defined by the appended claims below.

I claim:

1. A remote control system receiver, adapted to receive a signal transmitted from a remote unit and to transmit an associated control signal to a controllable device, comprising:

(a) a first receiver means for receiving said signal transmitted from said remote unit if said remote unit is located in a first angular region, whereby if said remote unit is not located within said first angular region, said signal transmitted from said remote unit will not be received by said first receiver means, (b) a second receiver means for receiving said signal transmitted from said remote unit if said remote unit is located in a second angular region, whereby if said remote unit is not located within said second angular region said signal transmitted by said remote unit will not be received by said second receiving means, and (c) processing means for determining the angular position of said remote unit responsive to said signal received by at least one of said first receiver means and said second receiver means, wherein said processing means transmits at least said angular position to said controllable device.

2. The remote control system receiver according to claim 1, wherein said first angular region corresponds to a region on the left side of said remote control system receiver, and wherein said second angular region corresponds to a region on the right side of said remote control system receiver.

3. The remote control system receiver according to claim 1, further comprising:

(d) a third receiver means for receiving said signal transmitted from said remote unit if said remote unit is located in a third angular region, whereby if said remote unit is not located within said third angular region said signal transmitted by said remote unit will not be received by said third receiving means.

4. The remote control system receiver according to claim 3, wherein said first angular region corresponds to a region on the left side of said remote control system receiver, wherein said second angular region corresponds to a region on the right side of said remote control system receiver, and wherein said third angular region corresponds to a region on the top side of said remote control system receiver.

5. The remote control system receiver according to claim 1, wherein said first receiver means comprises:

(i) a detector means for receiving said signal transmitted from said remote unit, and (ii) an angle-limiting means extending from said detector means for limiting said signal received by said detector to said first angular region.

6. The remote control system receiver according to claim 5, wherein said remote unit further comprises transmitting means and said signal transmitted by said remote transmitting means comprises an infra-red signal.

7. The remote control system receiver according to claim 6, wherein said transmitting means of said remote unit includes a light-emitting diode, and wherein said infra-red signal is transmitted from said light-emitting diode.

8. The remote control system receiver according to claim 6, wherein said detector means includes an infra-red detector.

9. The remote control system receiver according to claim 5, wherein said angle-limiting means comprises a truncated pyramid, wherein said detector means is located at the apex of said truncated pyramid.

10. The remote control system receiver according to claim 1, wherein said second receiver means comprises:

(i) a detector means for receiving said signal transmitted from said remote unit, and (ii) an angle-limiting means extending from said detector means for limiting said signal received by said detector to said second angular region.

11. The remote control system receiver according to claim 1, wherein said processing means includes a microprocessor.

12. The remote control system receiver according to claim 1, wherein said processing means includes a PIC16C54 microprocessor.

13. The remote control system receiver according to claim 1, wherein said processing means includes a microprocessor from the following group: 87C51 or 80C31.

14. The remote control system receiver according to claim 1, wherein said controllable device is a video game.

15. The remote control system receiver according to claim 1, wherein said controllable device is a Nintendo Entertainment System.

16. A remote control system adapted to control a controllable device, said remote control system comprising:

(a) a remote transmitting means for transmitting a signal, (b) a first receiver means for receiving said signal transmitted from said remote transmitting means if said remote unit is located in a first angular region, whereby if said remote transmitting means is not located in a said first angular region, said signal transmitted from said remote transmitting means is not received by said first receiver means, (c) a second receiver means for receiving said signal transmitted from said remote unit if said remote transmitting means is located in a second angular region, whereby if said remote transmitting means is not located within said second angular region, said signal transmitted by said remote transmitting means is not received by said second receiving means, and (d) processing means for determining the angular position of said remote transmitting means responsive to said signal received by at least one of said first receiver means and said second receiver means, wherein said processing means transmits at least said angular position to said controllable device.

17. The remote control system receiver according to claim 16, wherein said first angular region corresponds to a region on the left side of said remote control system receiver, and wherein said second angular region corresponds to a region on the right side of said remote control system receiver.

18. The remote control system receiver according to claim 16, further comprising:

(e) a third receiver means for receiving said signal transmitted from said remote transmitting means if said remote unit is located in a third angular region, whereby if said remote unit is not located within said third angular region, said signal transmitted by said remote transmitting means is not received by said third receiving means.

19. The remote control system receiver according to claim 18, wherein said first angular region corresponds to a region on the left side of said remote control system receiver, wherein said second angular region corresponds to a region on the right side of said remote control system receiver, and wherein said third angular region corresponds to a region on the top side of said remote control system receiver.

20. The remote control system according to claim 16, wherein said first receiver means comprises:

(i) a detector means for receiving said signal transmitted from said remote transmitting means, and (ii) an angle-limiting means extending from said detector means for limiting said signal received by said detector to said first angular region.

21. The remote control system according to claim 20, wherein said angle-limiting means comprises a truncated pyramid, wherein said detector means is located at the apex of said truncated pyramid.

22. The remote control system according to claim 20, wherein said signal comprises an infra-red signal.

23. The remote control system according to claim 22, wherein said remote transmitting means includes a light-emitting diode, wherein said infra-red signal is transmitted from said light-emitting diode.

24. The remote control system according to claim 22, wherein said detector means includes an infra-red detector.

25. The remote control system according to claim 16 wherein said second receiver means comprises:
(i) a detector means for receiving said signal transmitted from said remote transmitting means, and
(ii) an angle-limiting means extending from said detector means for limiting said signal received by said detector to second angular region.

26. The remote control system according to claim 16, wherein said processing means includes a microprocessor.

27. The remote control system receiver according to claim 16, wherein said controllable device is a video game.

28. The remote control system receiver according to claim 16, wherein said controllable device is a Nintendo Entertainment System.

* * * * *